United States Patent
Dar et al.

(10) Patent No.: US 12,212,608 B1
(45) Date of Patent: Jan. 28, 2025

(54) MESSAGING SYSTEM CAPABLE OF CONVERTING ELECTRONIC MESSAGES ON A TELECOMMUNICATIONS NETWORK

(71) Applicant: T-Mobile USA, Inc., Bellevue, WA (US)

(72) Inventors: Sheraz Farooq Dar, Everett, WA (US); Srikanth Bionapally, Sammamish, WA (US); Venkat Kondeti, Maple Valley, WA (US); Niranjan Piratla, Renton, WA (US); Zakir Hussain Syed, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/596,518

(22) Filed: Mar. 5, 2024

(51) Int. Cl.
| | |
|---|---|
| *H04L 65/1016* | (2022.01) |
| *H04L 65/1045* | (2022.01) |
| *H04L 65/1104* | (2022.01) |
| *H04L 65/1108* | (2022.01) |
| *H04L 67/02* | (2022.01) |

(52) U.S. Cl.
CPC ...... *H04L 65/1016* (2013.01); *H04L 65/1045* (2022.05); *H04L 65/1104* (2022.05); *H04L 65/1108* (2022.05); *H04L 67/02* (2013.01)

(58) Field of Classification Search
CPC ............. H04L 65/1016; H04L 65/1045; H04L 65/1104; H04L 65/1108; H04L 67/02
See application file for complete search history.

(56) References Cited

U.S. PATENT DOCUMENTS

| | | |
|---|---|---|
| 7,155,243 B2 | 12/2006 | Baldwin et al. |
| 7,200,680 B2 | 4/2007 | Evans et al. |
| 7,260,412 B2 | 8/2007 | Shaheen |
| 7,317,929 B1 | 1/2008 | El-fishawy et al. |
| 7,689,234 B2 | 3/2010 | Horvath et al. |
| 7,701,969 B2 | 4/2010 | Carrigan et al. |

(Continued)

FOREIGN PATENT DOCUMENTS

| | | |
|---|---|---|
| CN | 102740245 A | 10/2012 |
| CN | 103139731 A | 6/2013 |

(Continued)

*Primary Examiner* — Kibrom T Hailu
*Assistant Examiner* — Najeeb Ansari
(74) *Attorney, Agent, or Firm* — Perkins Coie LLP

(57) ABSTRACT

A system receives an electronic message over the internet at a WebRTC gateway (WRG) of a telecommunications network. The system forwards the electronic message to a call session control function (CSCF) using session initiation protocol (SIP). The system detects a failed delivery of the electronic message at a rich communication service configured to deliver and monitor delivery of the electronic message and report failed deliveries. The system generates a failed delivery notification indicating that the electronic message was not delivered. The system receives the failed delivery notification at the WRG and at the WRG converts the electronic message to either a short messaging service (SMS) or multimedia messaging service (MMS) message. The system sends the SMS or MMS message from the WRG to the CSCF using SIP. The system forwards the SMS or MMS message to a short message service center (SMSC), which delivers the SMS or MMS message.

19 Claims, 5 Drawing Sheets

(56) References Cited

U.S. PATENT DOCUMENTS

| | | |
|---|---|---|
| 7,702,342 B2 | 4/2010 | Duan |
| 7,715,856 B2 | 5/2010 | Shaheen |
| 7,720,492 B2 | 5/2010 | Becker et al. |
| 7,751,836 B2 | 7/2010 | Bantukul et al. |
| 7,917,161 B2 | 3/2011 | Tang et al. |
| 7,924,792 B2 | 4/2011 | Shen et al. |
| 7,949,328 B2 | 5/2011 | Jiang |
| 7,983,245 B2 | 7/2011 | Eichler et al. |
| 7,991,384 B2 | 8/2011 | Li |
| 7,991,411 B2 | 8/2011 | Johnson et al. |
| 8,027,695 B2 | 9/2011 | Zabawskyj et al. |
| 8,068,860 B1 | 11/2011 | Midkiff |
| 8,073,473 B2 | 12/2011 | Huggett |
| 8,090,392 B2 | 1/2012 | Shaheen |
| 8,095,157 B2 | 1/2012 | Bharadwaj |
| 8,170,590 B2 | 5/2012 | Wang |
| 8,175,236 B2 | 5/2012 | Pandey et al. |
| 8,244,905 B2 | 8/2012 | Bhatt et al. |
| 8,325,708 B2 | 12/2012 | Lim et al. |
| 8,340,700 B2 | 12/2012 | Modin |
| 8,478,313 B2 | 7/2013 | Kim et al. |
| 8,543,107 B1 | 9/2013 | Bertz et al. |
| 8,831,648 B2 | 9/2014 | Bantukul |
| 9,769,631 B2 | 9/2017 | Yi |
| 2003/0016639 A1 | 1/2003 | Kransmo et al. |
| 2006/0291471 A1 | 12/2006 | Heuer et al. |
| 2007/0136431 A1 | 6/2007 | Sun |
| 2008/0240117 A1 | 10/2008 | Gavita et al. |
| 2009/0221310 A1 | 9/2009 | Chen et al. |
| 2010/0075700 A1 | 3/2010 | Casto et al. |
| 2011/0136492 A1 | 6/2011 | Bailey et al. |
| 2011/0276645 A1 | 11/2011 | Andersson et al. |
| 2015/0120841 A1* | 4/2015 | Maria ................ H04L 65/1016 709/206 |
| 2022/0086118 A1* | 3/2022 | Jain ........................ H04W 4/12 |
| 2022/0384061 A1* | 12/2022 | Nandwana ............. G16H 10/60 |
| 2024/0022616 A1* | 1/2024 | Zhao .................... H04L 65/1108 |
| 2024/0056489 A1* | 2/2024 | Bouazizi ................ H04L 65/65 |

FOREIGN PATENT DOCUMENTS

| | | |
|---|---|---|
| CN | 103167435 A | 6/2013 |
| CN | 102137341 B | 11/2013 |
| EP | 1757113 A2 | 2/2007 |
| EP | 2391147 A1 | 11/2011 |
| EP | 2730109 A2 | 5/2014 |
| EP | 2732565 A1 | 5/2014 |
| JP | 4860750 B2 | 11/2011 |
| JP | 5535536 B2 | 5/2014 |
| KR | 200402238 Y1 | 11/2005 |
| KR | 100650168 B1 | 11/2006 |
| KR | 100853881 B1 | 8/2008 |
| WO | 2007128221 A1 | 11/2007 |
| WO | 2008040214 A1 | 4/2008 |
| WO | 2011110131 A2 | 9/2011 |
| WO | 2012006814 A1 | 1/2012 |
| WO | 2012155768 A1 | 11/2012 |
| WO | 2012164551 A2 | 12/2012 |
| WO | 2013002493 A2 | 1/2013 |
| WO | 2013047976 A1 | 4/2013 |
| WO | 2013090712 A1 | 6/2013 |

\* cited by examiner

MESSAGING SYSTEM CAPABLE OF CONVERTING ELECTRONIC MESSAGES ON A TELECOMMUNICATIONS NETWORK

BACKGROUND

Messaging technology is a type of online chat that allows real-time text transmission over the internet or another computer network. Messages are typically transmitted between two or more parties when each user inputs text and triggers a transmission to the recipient(s), who are all connected to a common network. It differs from email in that conversations over instant messaging happen in real-time. Most modern messaging applications (sometimes called "social messengers," "messaging apps," or "chat apps") use push technology and also add other features such as emojis (or graphical smileys), file transfers, chatbots, voice over internet protocol (IP), or video chat capabilities.

Messaging systems tend to facilitate connections between specified known users (often using a contact list also known as a "buddy list" or "friend list") and can be stand-alone applications or integrated into, e.g., a wider social media platform or a website where it can, for instance, be used for conversational commerce. Messaging can also consist of conversations in "chat rooms." Depending on the converged IP messaging (CPM) standard, the technical architecture can be peer-to-peer (direct point-to-point transmission) or client-server (an instant message service center retransmits messages from the sender to the communication device). It is usually distinguished from text messaging, which typically uses a store and forward method and normally uses cellular phone networks.

BRIEF DESCRIPTION OF THE DRAWINGS

Detailed descriptions of implementations of the present invention will be described and explained through the use of the accompanying drawings.

Figure 1:
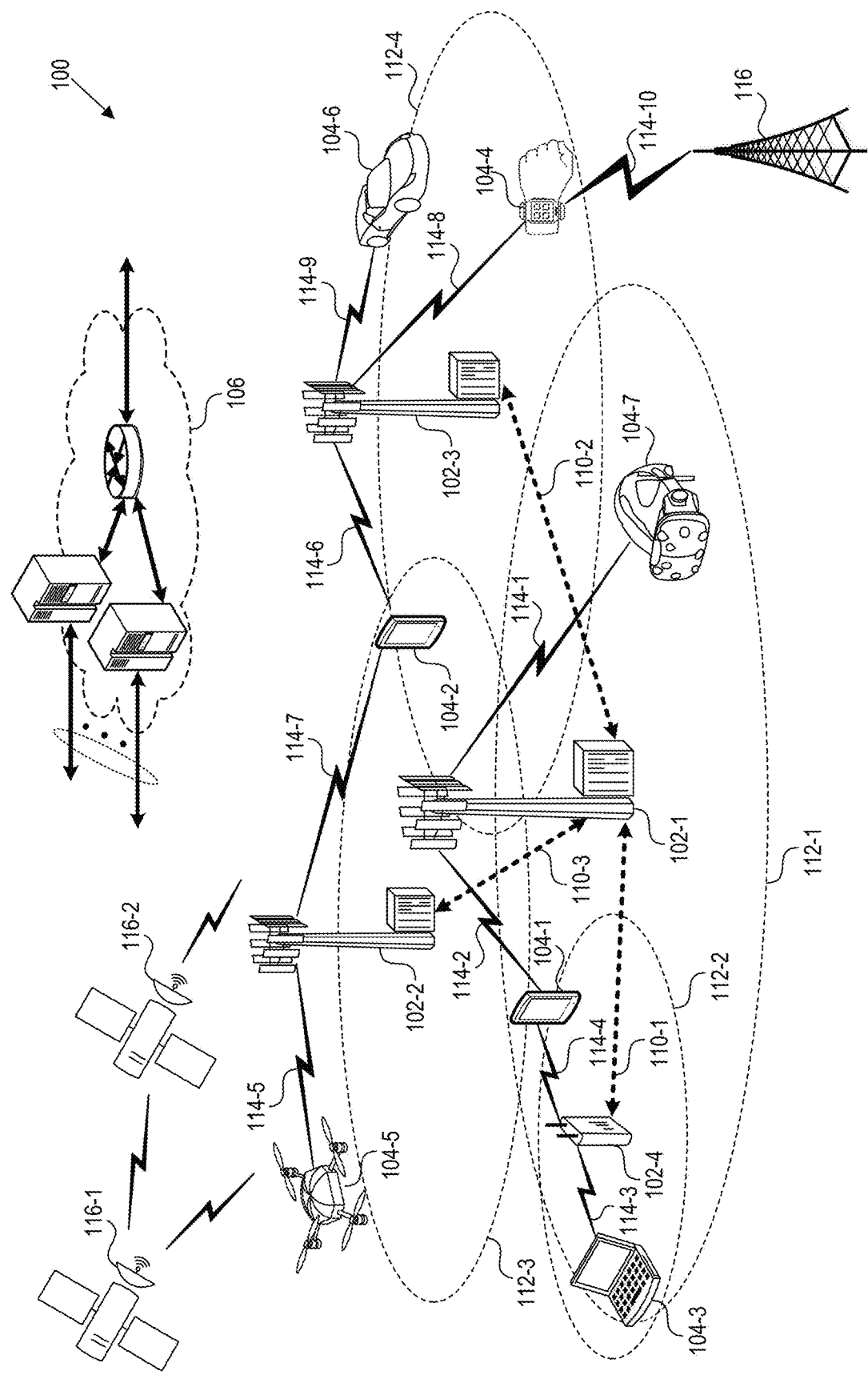
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

When an internet-based over-the-top (OTT) messaging application fails to deliver a message, the messaging application must resend the message over SMS or MMS. Complications arise when errors occur that prevent the internet-based messaging application from being notified of the failed message delivery. This leaves the message sender believing that the message was properly delivered when it was not. The disclosed technology includes a system of bypassing this problem by handling all message fallback procedures on the network side instead of through the internet-based messaging application.

The disclosed invention accomplishes this by receiving an electronic message over the internet from an OTT messaging application. The electronic message is first received at a WebRTC gateway (WRG). The WRG forwards the message to a call session control function (CSCF) using the session initiation protocol (SIP). The CSCF is then configured to manage the SIP signaling to route the electronic message from one end-user to the intended recipient. The rich communication services (RCS) sends the electronic message to the intended recipient using the SIP. Additionally, the RCS monitors the electronic message delivery to detect a failed message delivery error. Once a failed message delivery error is detected, the RCS generates a notification telling the WRG that the electronic message was not delivered to the intended recipient. After receiving the failed message delivery error notification, the WRG automatically converts the electronic message into either a short message service (SMS) message or a multimedia message service (MMS) message. The electronic message is converted into an SMS message if the electronic message only contains text, while it is converted into an MMS message if the electronic message is a multimedia message and contains, for example, an attached file, picture, video, or website link. The SMS or MMS message is resent from the WRG to the CSCF over the SIP. The CSCF then forwards the SMS or MMS message to the short message service center (SMSC). The SMSC provides basic checks to ensure that the SMS or MMS message is delivered to the intended recipient. The process is completed without ever needing to notify the sender that the electronic message was not delivered or causing the user to resend the message manually.

Operation of the messaging system as disclosed herein causes a reduction in greenhouse gas emissions compared to traditional methods of transmitting SMS and MMS messages when a failed message delivery occurs. Every year, approximately 40 billion tons of $CO_2$ are emitted around the world. Power consumption by digital technologies including telecommunications networks account for approximately 4% of this figure. Further, conventional networks can sometimes exacerbate the causes of climate change. For example, the average U.S. power plant expends approximately 600 grams of carbon dioxide for every kWh generated. The implementations disclosed herein for converting an electronic message to an SMS or MMS message when a failure occurs can mitigate climate change by reducing and/or preventing additional greenhouse gas emissions into the atmosphere. For example, converting the electronic message at the WRG prevents the need to transfer a failed delivery notification to the message's originating source, covert the electronic message at the originating source, and then resend the converted electronic message. Each of these steps consumes an amount of power consumption, causing more greenhouse gases to be emitted compared to the disclosed technology. Therefore, less power is consumed because the electronic message can be converted at the WRG, reducing the need to send additional messages to the originating source of the message.

Moreover, in the U.S., datacenters are responsible for approximately 2% of the country's electricity use, while globally they account for approximately 200 terawatt Hours (TWh). Transferring 1 GB of data can produce approximately 3 kg of CO2. Each GB of data downloaded thus results in approximately 3 kg of CO2 emissions or other greenhouse gas emissions. The storage of 100 GB of data in the cloud every year produces approximately 0.2 tons of CO2 or other greenhouse gas emissions. As stated above, the disclosed implementations reduce the amount of data transferred between devices by eliminating the number of messages transmitted when there is a failed message delivery event. Therefore, the disclosed implementations mitigate climate change and the effects of climate change by reducing the amount of data transmitted and downloaded in comparison to conventional network technologies.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
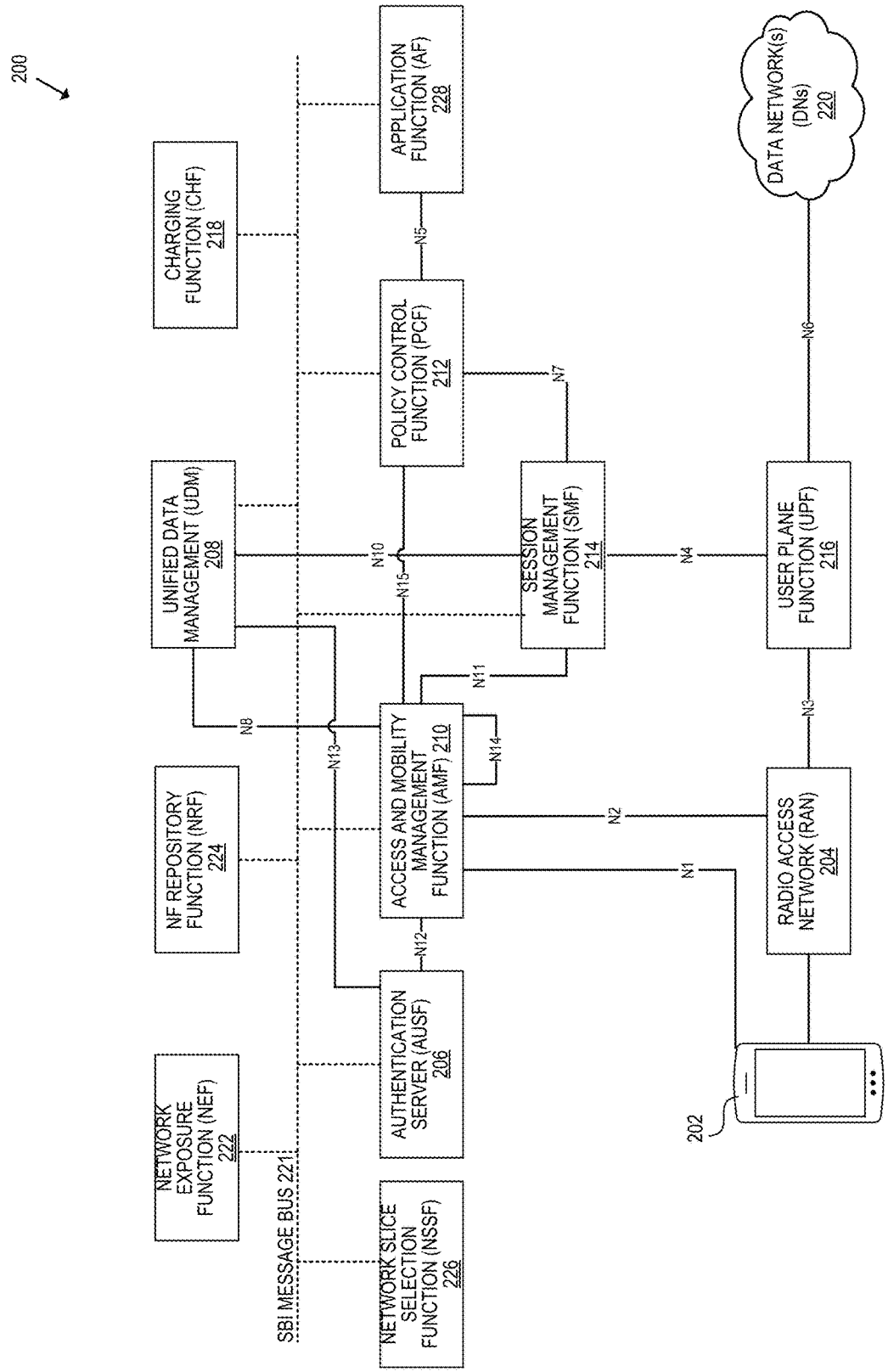
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Electronic Message Conversion System

Figure 3:
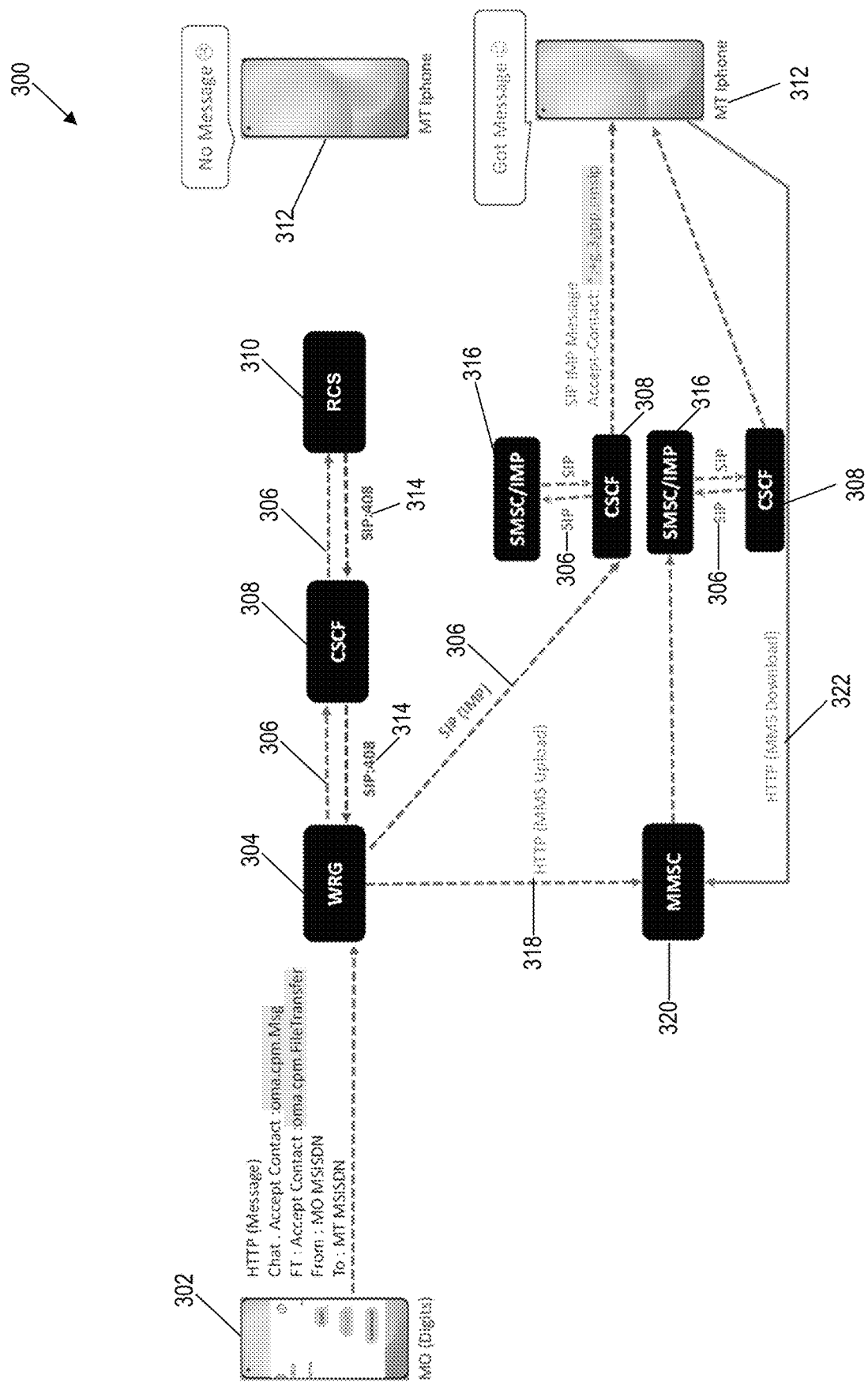
FIG. 3 is a block diagram that illustrates an example of the system delivering an electronic message as a short messaging service (SMS) message or multimedia messaging service (MMS) message when a failed delivery notification is received.

FIG. 3 is a block diagram that illustrates an example of the disclosed technology wherein the system 300 delivers an electronic message when a failed delivery notification 314 is received. A WebRTC gateway (WRG) 304 receives an electronic message from a user device 302 sent over the internet using a telecommunications network. The user device 302 can be a computer, smartphone, or any smart device connected to the internet. The WRG 304 forwards the electronic message to a call session control function (CSCF) 308 using the session initiation protocol (SIP) 306. The CSCF 308 is responsible for forwarding the electronic message to the intended recipient device 312 via the RCS 310. The RCS 310, which for example can be a RCS server, monitors the delivery of the electronic message to determine if the electronic message was received by the intended recipient device 312. The RCS 310 can sit at the edge of the network and detect errors such as a failed delivery of the electronic message to the intended recipient device 312. For example, a failed electronic message delivery may occur due to the intended recipient device 312 not having a connection to the telecommunications network or having a failed integrated management system (IMS) registration. Once a failed delivery of the electronic message occurs, the RCS 310 generates a failed delivery notification 314. The system sends the failed delivery notification 314 to the CSCF 308, where the CSCF forwards the failed delivery notification 314 to the WRG 304.

In response to receiving the failed delivery notification 314, the WRG 304 converts the electronic message to either a short messaging service (SMS) or multimedia messaging service (MMS) message. In one example, the electronic message is converted to an SMS message when the electronic message is text-based. The WRG 304 sends the SMS message to the CSCF 308 using the SIP 306. The CSCF 308 then forwards the SMS message to the short message service center (SMSC) 316. The SMSC 316 provides basic checks to ensure that the SMS message is delivered to the intended recipient. The SMSC 316 forwards the SMS message to the intended recipient device 312.

In another example, the electronic message contains media such as an image file, audio file, video file, text file, website link, or phone contact. The electronic message is converted to an MMS message at the WRG 304. The WRG 304 sends the MMS message to the multimedia messaging service center (MMSC) 320 using the hypertext transfer protocol (HTTP) 318. The MMSC 320 stores the media contained in the MMS message and generates an SMS message with an electronic link to the media contained in the MMS message. The MMSC 320 sends the SMS message with the electronic link to the CSCF 308. The CSCF 308 forwards the SMS message with the electronic link to the SMSC 316. The SMSC 316 forwards the SMS message with the electronic link to the intended recipient device 312. The intended recipient device 312 accesses the electronic link to download the media from the MMSC 320 using the HTTP MMS download 322.

Figure 4:
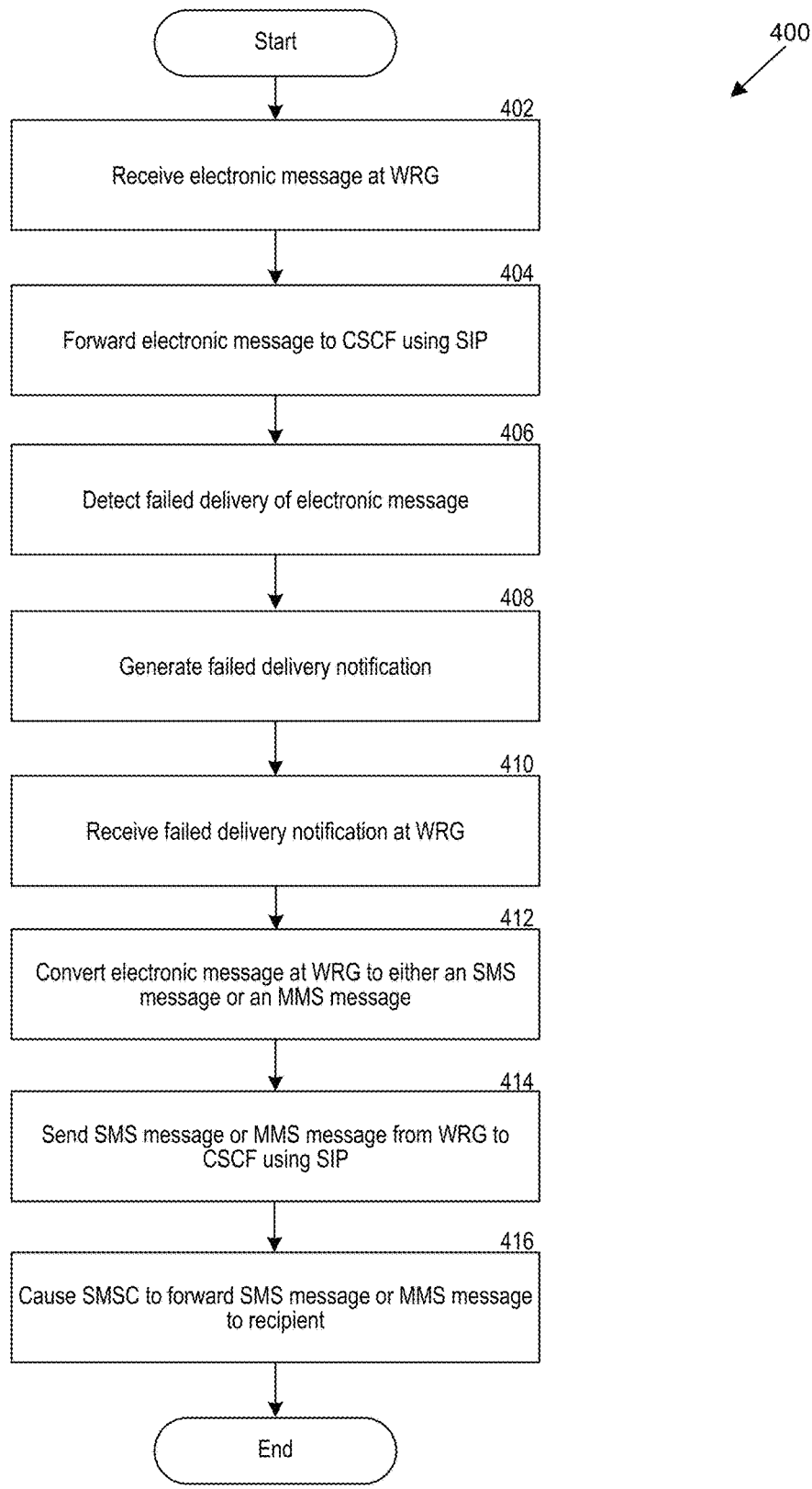
FIG. 4 is a flowchart that illustrates a process for converting electronic messages to either SMS or MMS messages on a telecommunications network and delivering them to an intended recipient.

FIG. 4 is a flowchart that illustrates a process 400 for converting electronic messages into SMS messages or MMS messages on a telecommunications network. The process can be performed by a system of a telecommunications network. In one example, the system includes at least one hardware processor and at least one non-transitory memory storing instructions, which, when executed by at least one hardware processor, cause the system to perform the process 400.

At 402, the system can receive an electronic message at a WRG of the telecommunications network. In one example, an electronic message is sent over the internet. In another example, the system configured to receive the electronic message at the WRG from an internet-based over-the-top (OTT) messaging application is incapable of sending SMS messages or MMS messages. The internet-based OTT messaging application is installed on a smart device, computer, or smartphone.

At 404, the system can forward the electronic message to a call session control function (CSCF) using session initiation protocol (SIP). At 406, the system can detect a failed delivery of the electronic message to a recipient. In one example, a a rich communication service (RCS) is configured to monitor the delivery of the electronic message to the recipient and report failed deliveries. At 408, the system can generate a failed delivery notification. In one example, the failed delivery error indicates that the electronic message was not received by the recipient. At 410, the system can receive the failed delivery notification at the WRG.

At 412, the system can convert, in response to receiving the failed delivery notification at the WRG, the electronic message at the WRG to either a short messaging service (SMS) message or a multimedia messaging service (MMS) message. In one example, the system is configured to convert the electronic message at the WRG, reducing greenhouse gas emissions by reducing the amount of energy consumed by converting the electronic message at the WRG instead of transferring the failed delivery notification to its originating source, converting the electronic message at its originating source, and resending the converted electronic message. In another example, the system can categorize the electronic message received as either an SMS message or an MMS message. The category can be based on the type of media found within the electronic message. The category can determine the type of message the electronic message is converted to if a failed delivery occurs. The system can save the electronic message at the WRG. The electronic message can be saved at the WRG until the electronic message is successfully delivered.

In another example, the electronic message corresponding to a text-based message is converted to an SMS message. In one example, the system is configured to convert the electronic message to an SMS message. The system can divide the SMS message into multiple SMS messages based on the number of characters contained in the electronic message. The SMS message has a maximum character count of 160 characters when the electronic message only contains text and a maximum character count of 70 characters when the electronic message contains text and Unicode characters. The system can send the multiple SMS messages from the WRG to the CSCF using SIP. The CSCF forwards the SMS message to an SMSC. The system can cause the SMSC to forward the multiple SMS messages to the recipient. The SMSC monitors the multiple SMS messages to ensure delivery to the recipient.

In another example, the electronic message, including media, is converted to an MMS message. The type of media found in the electronic message can include an image file, an audio file, a video file, a text file, a website link, and/or a phone contact. In one example, the system is configured to convert the electronic message to an MMS message. The system can forward the MMS message from the WRG to an MMSC and can generate, at the MMSC, an electronic link to the media contained in the MMS message. The system can send the electronic link from the MMSC to the CSCF using SIP. The CSCF forwards the electronic link to an SMSC, where the electronic link is sent within the SMS message. The system can cause the SMSC to forward the electronic link to the recipient. The SMSC monitors the electronic link to ensure delivery to the recipient. The system can download the media from the MMSC to the recipient once the download link is activated.

At 414, the system can send the SMS message or MMS message from the WRG to the CSCF using SIP. In one example, the CSCF forwards the SMS message or MMS message to an SMSC. At 416, the system can cause the SMSC to forward the SMS message or MMS message to the recipient. In one example, the SMSC monitors the message to ensure delivery to the recipient. In another example, the system can receive a successful delivery notification at the CSCF and can generate a delivery notification at the WRG. The delivery notification indicates that the electronic message was delivered as the SMS message or the MMS message and indicates that the recipient received the SMS message or the MMS message. The system can forward the delivery notification to a user device.

Computer System

Figure 5:
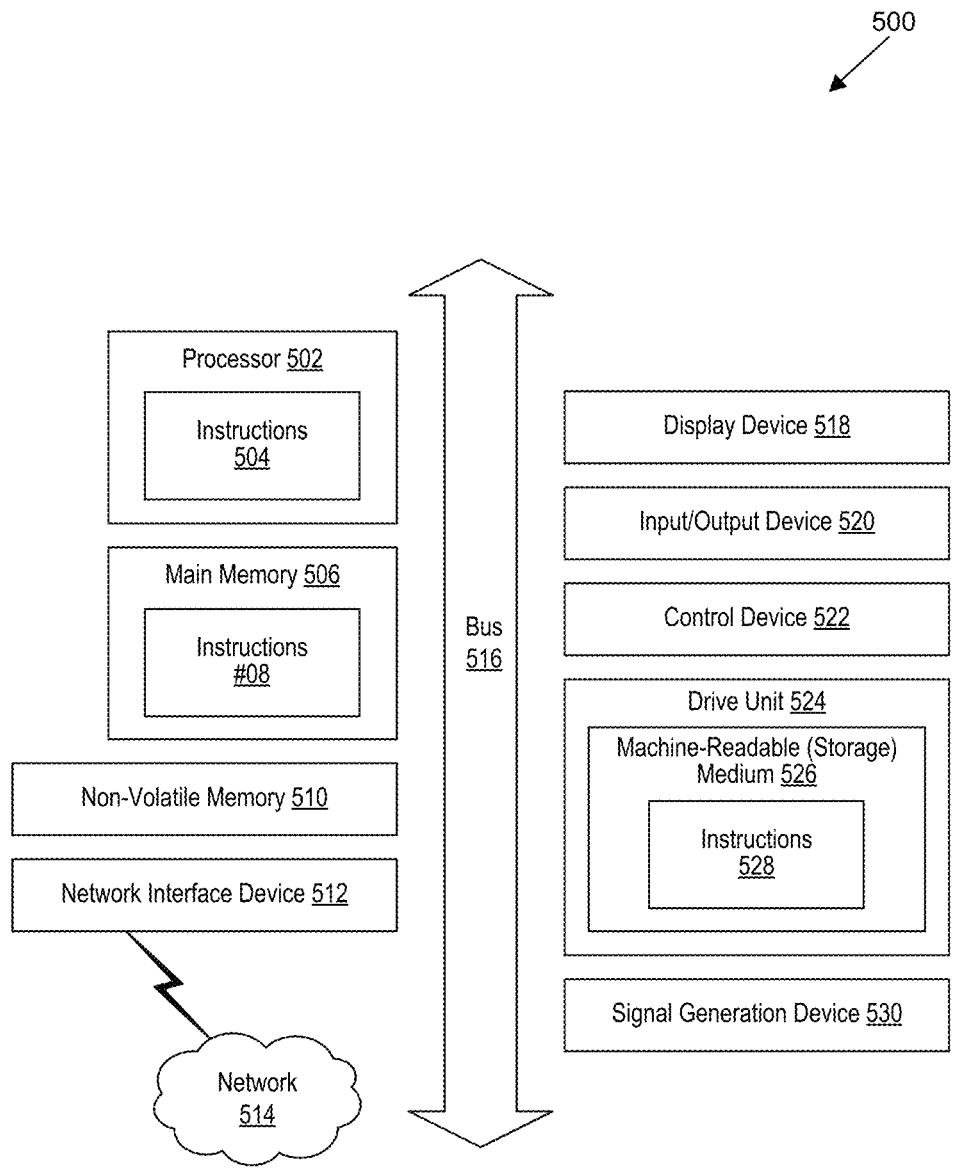
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation.

The applicant reserves the right to pursue such additional claim forms either in this application or in a continuing application.

We claim:

1. A system of a telecommunications network, the system comprising:
   at least one hardware processor; and
   at least one non-transitory memory storing instructions, which, when executed by the at least one hardware processor, cause the system to:
      receive an electronic message at a WebRTC gateway (WRG) of the telecommunications network,
         wherein the electronic message is sent over the internet;
      forward the electronic message to a call session control function (CSCF) using session initiation protocol (SIP);
      detect a failed delivery of the electronic message to a recipient,
         wherein a rich communication service (RCS) is configured to monitor delivery of the electronic message to the recipient, and report failed deliveries;
      generate a failed delivery notification,
         wherein the failed delivery notification indicates that the electronic message was not received by the recipient;
      receive the failed delivery notification at the WRG;
      categorize the electronic message received as either a short messaging service (SMS) message or a multimedia messaging service (MMS) message,
         wherein a category is based on a type of media found within the electronic message, and
         wherein the category determines the type of message the electronic message is converted to if a failed delivery occurs;
      convert, in response to receiving the failed delivery notification at the WRG, the electronic message at the WRG to either a short messaging the SMS message the MMS message,
         wherein the electronic message corresponding to a text-based message is converted to an SMS message, and
         wherein the electronic message including the type of media is converted to an MMS message;
      save the electronic message at the WRG,
         wherein the electronic message is saved at the WRG until the electronic message is successfully delivered;
      send the SMS message or the MMS message from the WRG to the CSCF using SIP,
         wherein the CSCF forwards the SMS message or the MMS message to a short message service center (SMSC); and
      cause the SMSC to forward the SMS message or the MMS message to the recipient,
         wherein the SMSC monitors the SMS message or the MMS message to ensure delivery to the recipient.

2. The system of claim 1, wherein the type of media found in the electronic message includes:
   an image file;
   an audio file;
   a video file;
   a text file;
   a website link; or
   a phone contact.

3. The system of claim 1, wherein the electronic message is converted to the MMS message, the instructions further cause the system to:
   forward the MMS message from the WRG to a multimedia messaging service center (MMSC);
   generate, at the MMSC, an electronic link to the media contained in the MMS message;
   send the electronic link from the MMSC to the CSCF using the SIP,
      wherein the CSCF forwards the electronic link to the SMSC,
      wherein the electronic link is sent within the SMS message;
   cause the SMSC to forward the electronic link to the recipient,
      wherein the SMSC monitors the electronic link to ensure delivery to the recipient; and
   download the media from the MMSC to the recipient once the electronic link is activated.

4. The system of claim 1:
   wherein converting the electronic message at the WRG reduces greenhouse gas emissions by reducing an amount of energy consumed by converting the electronic message at the WRG instead of transferring the failed delivery notification to its originating source, converting the electronic message at its originating source, and resending the converted electronic message.

5. The system of claim 1:
   wherein the electronic message is received by the WRG from an internet-based over-the-top (OTT) messaging application incapable of sending SMS messages or MMS messages, and
   wherein the internet-based OTT messaging application is installed on a smart device, computer, or smartphone.

6. The system of claim 1 further caused to:
   receive a successful delivery notification at the CSCF;
   generate a delivery notification at the WRG,
      wherein the delivery notification indicates that the electronic message was delivered as the SMS message or the MMS message, and
      wherein the delivery notification indicates that the recipient received the SMS message or the MMS message; and
   forward the delivery notification to a user device.

7. The system of claim 1, wherein the electronic message is converted to the SMS message, the instructions further cause the system to:
   divide the SMS message into multiple SMS messages based on a number of characters contained in the electronic message,
      wherein the SMS message has a maximum character count of 160 characters when the electronic message only contains text, and
      wherein the SMS message has a maximum character count of 70 characters when the electronic message contains text and Unicode characters;
   send the multiple SMS messages from the WRG to the CSCF using the SIP, wherein the CSCF forwards the SMS message to the SMSC; and
   cause the SMSC to forward the multiple SMS messages to the recipient, wherein the SMSC monitors the multiple SMS messages to ensure delivery to the recipient.

8. A non-transitory, computer-readable storage medium comprising instructions recorded thereon, wherein the instructions when executed by at least one data processor of a system cause the system to:
   receive an electronic message at a WebRTC gateway (WRG) of a telecommunications network,
     wherein the electronic message is sent over the internet;
   forward the electronic message to a call session control function (CSCF) using session initiation protocol (SIP);
   detect a failed delivery of the electronic message to a recipient at a rich communication service (RCS);
   generate a failed delivery notification;
   receive the failed delivery notification at the WRG;
   categorize the electronic message received as either a short messaging service (SMS) message or a multimedia messaging service (MMS) message,
     wherein a category is based on a type of media found within the electronic message, and
     wherein the category determines the type of message the electronic message is converted to if a failed delivery occurs;
   convert, in response to receiving the failed delivery notification at the WRG, the electronic message at the WRG to either the SMS message or the MMS message,
     wherein the electronic message corresponding to a text-based message is converted to an SMS message, and
     wherein the electronic message including the type of media is converted to an MMS message;
   save the electronic message at the WRG,
     wherein the electronic message is saved at the WRG until the electronic message is successfully delivered;
   send the SMS message or the MMS message from the WRG to the CSCF using SIP,
     wherein the CSCF forwards the SMS message or the MMS message to a short message service center (SMSC); and
   cause a short message service center (SMSC) to forward the SMS message or the MMS message to the recipient,
     wherein the SMSC monitors the SMS message or the MMS message to ensure delivery to the recipient.

9. The non-transitory, computer-readable storage medium of claim 8, wherein the instructions cause the system to:
   forward the MMS message from the WRG to a multimedia messaging service center (MMSC);
   generate, at the MMSC, an electronic link to the media contained in the MMS message;
   cause the SMSC to forward the electronic link to the recipient,
     wherein the SMSC monitors the electronic link to ensure delivery to the recipient; and
   download the media from the MMSC to the recipient once the electronic link is activated.

10. The non-transitory, computer-readable storage medium of claim 8:
   wherein the electronic message is received by the WRG from an internet-based over-the-top (OTT) messaging application incapable of sending SMS messages or MMS messages, and
   wherein the internet-based OTT messaging application is installed on a smart device, computer, or smartphone.

11. The non-transitory, computer-readable storage medium of claim 8, wherein the instructions cause the system to:
   receive a successful delivery notification at a call session control function (CSCF);
   generate a delivery notification at the WRG,
     wherein the delivery notification indicates that the electronic message was delivered as the SMS message or the MMS message, and
     wherein the delivery notification indicates that the recipient received the SMS message or the MMS message; and
   forward the delivery notification to a user device.

12. The non-transitory, computer-readable storage medium of claim 8, wherein the instructions cause the system to:
   divide the SMS message into multiple SMS messages based on a number of characters contained in the electronic message,
     wherein the SMS message has a maximum character count of 160 characters when the electronic message only contains text, and
     wherein the SMS message has a maximum character count of 70 characters when the electronic message contains text and Unicode characters; and
   cause the SMSC to forward the multiple SMS messages to the recipient.

13. The non-transitory, computer-readable storage medium of claim 8, wherein the type of media found in the electronic message includes:
   an image file;
   an audio file;
   a video file;
   a text file;
   a website link; or
   a phone contact.

14. A method comprising:
   receiving an electronic message at a WebRTC gateway (WRG) of a telecommunications network,
     wherein the electronic message is sent over the internet;
   forwarding the electronic message to a call session control function (CSCF) using session initiation protocol (SIP);
   detecting a failed delivery of the electronic message to a recipient,
     wherein a rich communication service (RCS) is configured to monitor delivery of the electronic message to the recipient, and report failed deliveries;
   generating a failed delivery notification;
   receiving the failed delivery notification at the WRG;
   categorizing the electronic message received as either a short messaging service (SMS) message or a multimedia messaging service (MMS) message,
     wherein a category is based on a type of media found within the electronic message, and
     wherein the category determines the type of message the electronic message is converted to if a failed delivery occurs;
   converting, in response to receiving the failed delivery notification at the WRG, the electronic message at the WRG to either the SMS message or the MMS message,
     wherein the electronic message corresponding to a text-based message is converted to an SMS message, and
     wherein the electronic message including the type of media is converted to an MMS message;
   saving the electronic message at the WRG,
     wherein the electronic message is saved at the WRG until the electronic message is successfully delivered;
   sending the SMS message or the MMS message from the WRG to the CSCF using SIP, wherein the CSCF forwards the SMS message or the MMS message to a short message service center (SMSC); and causing a short message service center (SMSC) to forward the SMS message or the MMS message to the recipient, wherein the SMSC monitors the SMS message or the MMS message to ensure delivery to the recipient.

15. The method of claim 14, further comprising:

forwarding the MMS message from the WRG to a multimedia messaging service center (MMSC);

generating, at the MMSC, an electronic link to the media contained in the MMS message;

causing the SMSC to forward the electronic link to the recipient, wherein the SMSC monitors the electronic link to ensure delivery to the recipient; and downloading the media from the MMSC to the recipient once the electronic link is activated.

16. The method of claim 14:

wherein the electronic message is received by the WRG from an internet-based over-the-top (OTT) messaging application incapable of sending SMS messages or MMS messages, and wherein the internet-based OTT messaging application is installed on a smart device, computer, or smartphone.

17. The method of claim 14, further comprising:

receiving a successful delivery notification at a call session control function (CSCF);

generating a delivery notification at the WRG, wherein the delivery notification indicates that the electronic message was delivered as the SMS message or the MMS message, and wherein the delivery notification indicates that the recipient received the SMS message or the MMS message; and forwarding the delivery notification to a user device.

18. The method of claim 14, wherein the type of media found in the electronic message includes:

an image file;
an audio file;
a video file;
a text file;
a website link; or
a phone contact.

19. The method of claim 14, wherein the electronic message is converted to the SMS message, further comprising dividing the SMS message into multiple SMS messages based on a number of characters contained in the electronic message, wherein the SMS message has a maximum character count of 160 characters when the electronic message only contains text, and wherein the SMS message has a maximum character count of 70 characters when the electronic message contains text and Unicode characters;

causing the SMSC to forward the multiple SMS messages to the recipient, wherein the SMSC monitors the multiple SMS messages to ensure delivery to the recipient.

\* \* \* \* \*